No. 616,332. Patented Dec. 20, 1898.
A. HOWARD.
SHEARING IMPLEMENT.
(Application filed June 6, 1898.)
(No Model.)
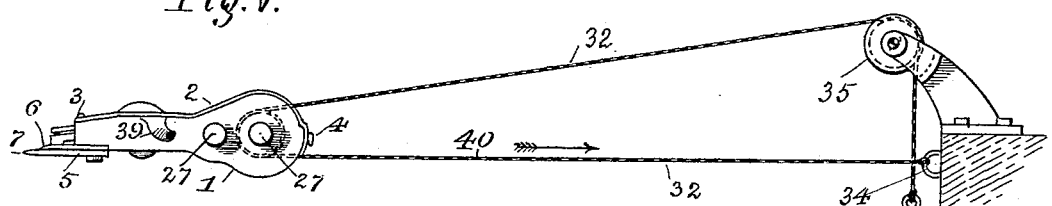
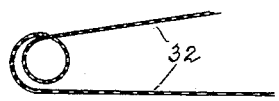
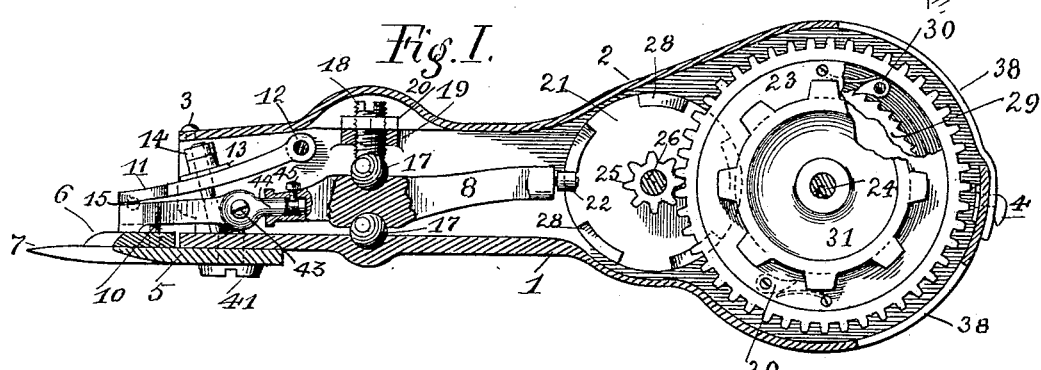
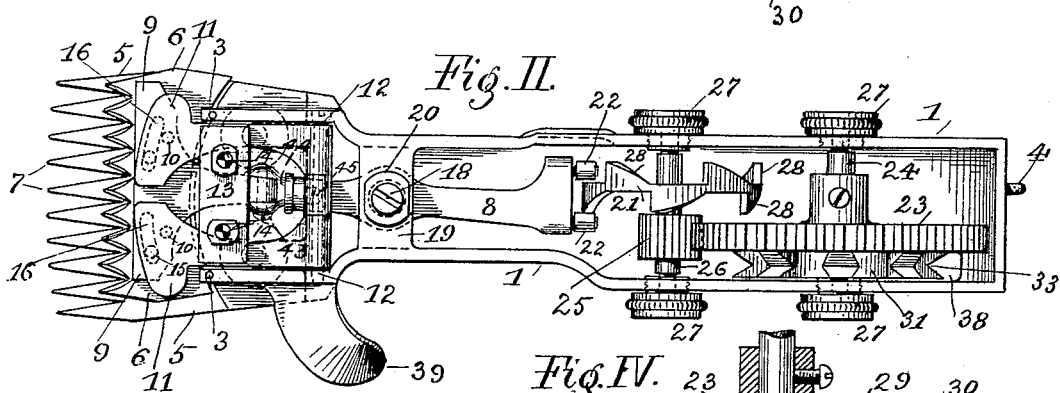
Witnesses.
F. E. Monteverde.
H. Sanderson.
Inventor.
Augustus Howard
By J. Richards & Co
Attys

UNITED STATES PATENT OFFICE.

AUGUSTUS HOWARD, OF SAN FRANCISCO, CALIFORNIA, ASSIGNOR TO WILLARD REED GREEN, OF DENVER, COLORADO.

SHEARING IMPLEMENT.

SPECIFICATION forming part of Letters Patent No. 616,332, dated December 20, 1898.

Application filed June 6, 1898. Serial No. 682,639. (No model.)

*To all whom it may concern:*

Be it known that I, AUGUSTUS HOWARD, a subject of the Queen of Great Britain, residing at San Francisco, county of San Francisco, and State of California, have invented certain new and useful Improvements in Shearing Implements; and I hereby declare the following to be a full, clear, and exact description of the same, reference being had to the accompanying drawings, forming a part of this specification.

My invention relates to implements for shearing wool, hair, and the like and to an improved construction and manner of driving such implements.

My improvements consist in adapting such devices to be driven either by an independent power or to be driven as well as directed by an operator and in various features of a constructive and operative nature, hereinafter fully set forth and explained in connection with the drawings forming a part of this specification.

The object of my invention is to provide a shearing implement of a durable and simple form convenient in use and capable of being operated with or without independent motive power.

Referring to the drawings, Figure I is a side view of a shearing implement constructed and operating according to my invention, the front side of the inclosing case being removed. Fig. II is a plan view of Fig. I with the top part of the casing removed. Fig. III is an end view in front of the shearing or cutting knives and devices to support the same. Fig. IV is a horizontal section through the main driving gear-wheel and the driving mechanism therefor. Fig. V is a side elevation of the implement on a smaller scale and the driving-gearing therefor. Fig. VI is a diagram showing the manner of applying a driving-cord.

The supporting frame or casing 1 is made integral except the top part 2, which is removable to gain access to the operating parts and is held by the studs 3 in front and a revoluble clip 4 at the rear.

The cutting or shearing implements consist of the pronged stationary cutter 5 and the serrated vibrating detachable cutter 6, faced together and by their angular edges adapted to shearing wool, hair, or fiber of any kind that will pass between the teeth 7 of the cutter 5. The vibrating cutter 6 rests upon the face of the cutter 5, the contact-faces being cut away, as desired, to reduce friction. The cutter 6 is held in place by two or more carrier-pins 10, projecting into or through the top side thereof, thereby permitting the cutter 6 to be readily detachable, and which pins are borne by a T-shaped plate 9, bearing upon and spanning the top of said cutter 6 and placed with the broad portion of said plate forward or toward the cutting-teeth. The stem of said plate 9 is connected at its rearward end by a hinge 43 to a short round plug 44, which is inserted into a round hole bored into the end of the lever 8 to receive said plug, the said plug being made with an annular groove near its rearward end, into which a screw 45 projects through the side of said lever 8, preventing the withdrawal of said plug from said lever, while permitting it to rotate freely in the end of said lever, whereby the said T-shaped plate 9 is permitted to take both a turning movement through the action of said plug 44 and a lifting-and-falling movement through the action of said hinge 43, thus permitting the cutter 6 to adjust or accommodate itself to obstructions. The T-shaped plate 9 is caused to press upon the cutter 6 by the clamps or tension-plates 11, hinged at 12, as seen in Figs. I and II.

The clamps 11 are two in number, to more equally distribute their bearing at the sides of the cutter 6 and avoid torsion. They are held down by a flexible cap 13 with screws 14 and rest on the balls 15, that roll in grooves 16 formed in the clamps 11 and plate 9. (Indicated by dotted lines in Figs. II and III.)

The vibrating lever 8 is fulcrumed near the middle by means of the balls 17, one seated in a matrix formed in the main casing 1 and the other held by adjustable screw 18, passing through the cross-bar 19 and provided with a jam-nut 20, as shown in Fig. I.

The lever 8 is given a multiplied vibrating motion by means of the double crown-wheel 21, provided with cams 28, alternately formed on opposite sides, which engage the rollers 22, rotating on pins located on the rear end of said lever 8, moving the latter alternately right and left a distance each way equal to the depth of the cams, thus producing coincidently a rapid lateral reciprocating motion of the cutter 6, severing whatever passes into the teeth of the stationary cutter 5.

To impel the crown-wheel 21 I employ a driving-wheel 23, fastened on the cross-shaft 24 and meshing into the pinion 25 on the cross-shaft 26. These shafts 24 and 26 have bearings in the shells 27, screwed into the sides of the main casing 1 in such a manner as to be conveniently removed from the outside. The seats of these shells 27 are closed at their outer ends to exclude dust, and their seats in the casing are large enough to receive the full diameter of the cross-shafts 24 and 26, so these latter can be conveniently placed or removed through these seats or from the top when the plate 2 is taken off.

To impel the driving-wheel 23, there is a clutch device, comprising in this instance an internal rack-wheel 29, made integral with or fastened thereto and engaged by pawls 30 on the driving-pulley 31, the latter being mounted loosely on the shaft 24 and driven by a cord 32, passing once around in the groove 33, as indicated by the diagram Fig. VI. This cord 32 is attached at one end to some stationary point, as at 34, and after passing around the pulley 31 extends through apertures 38 in the main case 1 to a stationary pulley 35, and is attached to a weight 36, as shown in Fig. V.

To use the implement, the operator takes it in one hand, his thumb resting against the horn 39, and pulls against the tension of the cord 32, thus setting the wheel 23 and the cutters 6 in rapid motion and raising the weight as far as his hand will extend or as far as the length of the cord is arranged to permit. By then releasing the cord 32 the weight 36 descends, taking up the slack, the pawls 30 moving backward and the pulley 31 revolving free on the shaft 24. As soon as the weight 36 has descended as far as the slack of the cord permits another stroke can be made, thus producing a nearly-constant action of the cutter 6.

To remove the cutters 5 and 6 for sharpening the cutter-angles or for other purposes, the cutter 5 is slotted so as to pass under the heads of the screws 41 and can be instantly removed and replaced when these screws are loosened, freeing at the same time the cutter 6, which falls off the carrier-pins 10 as soon as the stationary cutter 5 is removed.

Thus it will be seen that all the various parts of the implement are accessible, easily removed and replaced, and are brought within such space and form as to be conveniently operated with one hand.

It will be understood that instead of the hand operating-cord 32 one driven by motive power can be employed and the implement operated without intermission.

I claim as my invention—

1. In a shearing implement, the cutters 5 and 6, plate 9, pins 10 secured thereon, plug 44, vibrating lever 8, to operate the same, rollers located upon the end thereof, and a crown-wheel with alternate cams on the sides thereof engaging said rollers to produce the vibrating cutting movement, substantially as specified.

2. In a shearing implement, the casing 1, removable top 2, and cross-shafts 24 and 26, impervious shell-bearings 27, in which the shafts are mounted, said bearings being screwed in from the outside of the casing and permitting removal of the shafts through the sides and from the top thereof substantially as specified.

3. In a shearing implement, the shaft 24, the driving-wheel 23, fast thereon, with rack-wheel 29, secured thereto, the driving-pulley 31 loose upon said shaft and having pawls engaging the rack-wheel, shaft 26, pinion 25 thereon, crown-wheel 21, fast upon the shaft, and the vibrating lever 8, adapted to receive motion from said wheel, substantially as specified.

4. In a shearing implement, the driving-wheel 23, the circular rack-wheel 29 chambered therein, the grooved pulley 31, the pawl 30 secured thereto, said pulley adapted to receive an impelling-cord, substantially as specified.

5. In a shearing implement, the fixed cutter 5, detachable vibrating cutter 6, plate 9, pins 10 secured thereon and lever 8 for actuating the latter, hinged clamps 11 for holding the faces of the cutters in close contact, flexible cap 13, adjusting-screws 14, and bearing-balls 15, the latter rolling in grooves formed in plate 9, and in clamps 11, substantially as specified.

6. In a shearing implement, the casing 1, provided with the removable cover 2, slots or apertures 38, to admit a driving-cord and a horn or stop 39 to prevent the tension of the cord from sliding the implement in the operator's hand, substantially as specified.

7. In a shearing implement, the fixed cutter 5, detachable vibrating cutter 6, plate 9, pins 10 secured thereon, hinge 43, plug 44, lever 8, balls 17, rollers 22, crown-wheel 21, shaft 26, pinion 25, driving-wheel 23, rack-wheel 29, shaft 24, driving-pulley 31 loose upon said shaft and having pawls engaging said rack-wheel, all operatively connected and coacting to the production of a vibrating motion of said cutters and the cutting of objects inserted between the teeth of said cutters.

8. In a shearing implement, the combination of the fixed and movable shearing-cutters 5 and 6, plate 9, pins 10 secured thereon, plug 44, vibrating lever 8, rollers 22, fixed upon the rear end thereof and crown-wheel 21 engaging said rollers with means for operating the same.

9. In a shearing implement, the combination of a detachable cutter 6, pins 10 engaging and controlling said cutter whereby it is readily removable, plate 9, bearing said pins, plug 44, to which said plate is hinged, with means to which the plug is loosely connected for operating the same whereby said plate may rise and fall and also turn to accommodate itself to working conditions and producing a cutting action.

In testimony whereof I affix my signature in presence of two witnesses.

AUGUSTUS HOWARD.

Witnesses:
WALTER B. PAYNE,
ALEXANDER J. STEUART.